United States Patent
Betzen

Patent Number: 5,526,737
Date of Patent: Jun. 18, 1996

[54] KITCHEN UTENSIL TO REMOVE FAT FROM BROTH

[76] Inventor: Keith M. Betzen, P.O. Box 5604, Bloomington, Ind. 47407-5604

[21] Appl. No.: 427,041

[22] Filed: Apr. 24, 1995

[51] Int. Cl.$^6$ ..................................................... C02F 1/40
[52] U.S. Cl. .............................. 99/495; 99/496; 210/470; D7/691
[58] Field of Search ................. 99/495, 496; 210/470, 210/497.01, 497.3, 499, 513, 514; D7/691; 30/325

[56] References Cited

U.S. PATENT DOCUMENTS

| | | | |
|---|---|---|---|
| D. 207,595 | 5/1967 | Gruber | D7/691 |
| D. 210,399 | 3/1968 | Wichmann | D7/691 |
| D. 255,862 | 7/1980 | Ferrin. | |
| 858,291 | 6/1907 | Irby | 210/470 |
| 1,028,717 | 6/1912 | Hallock. | |
| 1,036,822 | 8/1912 | Freeman. | |
| 1,048,546 | 12/1912 | Ketcham. | |
| 1,142,041 | 6/1915 | Hubbell. | |
| 1,240,360 | 9/1917 | Palmer. | |
| 1,253,612 | 1/1918 | Love. | |
| 1,334,169 | 3/1920 | Royer. | |
| 1,570,321 | 1/1926 | Sweeney. | |
| 1,950,378 | 3/1934 | Andrews. | |
| 2,143,782 | 1/1939 | Lewy | 210/470 |
| 2,287,156 | 6/1942 | White. | |
| 2,368,065 | 1/1945 | Hyatt. | |
| 2,572,524 | 10/1951 | Schmeiler. | |
| 2,575,768 | 11/1951 | Pearsall. | |
| 2,583,335 | 1/1952 | Jepson. | |
| 2,795,119 | 7/1957 | Bair | D7/691 |
| 3,284,349 | 11/1966 | Wessels. | |
| 3,308,953 | 3/1967 | Hinshaw. | |
| 3,326,384 | 6/1967 | Wessels. | |
| 3,392,845 | 7/1967 | Shapiro | 210/470 |
| 3,577,906 | 5/1971 | Preuss. | |
| 3,822,020 | 7/1974 | Hong | D7/691 |
| 3,865,023 | 2/1975 | Halvorsen. | |
| 4,331,189 | 5/1982 | Joyner. | |
| 4,389,926 | 6/1983 | Joyner. | |
| 4,464,265 | 8/1984 | Joyner. | |
| 4,640,185 | 2/1987 | Joyner. | |
| 4,825,551 | 5/1989 | Sherblom. | |
| 4,839,965 | 6/1989 | Levie. | |
| 4,934,420 | 6/1990 | Radna. | |
| 4,942,811 | 7/1990 | Kuhn. | |
| 5,005,294 | 4/1991 | Roberts et al.. | |
| 5,084,177 | 1/1992 | Keene | 210/470 |
| 5,097,756 | 3/1992 | Nolte. | |
| 5,182,860 | 2/1993 | Kuhlman. | |
| 5,199,349 | 4/1993 | Hansen. | |

Primary Examiner—David Scherbel
Assistant Examiner—Tony G. Soohoo

[57] ABSTRACT

In order to remove liquid fats that collect on the surface of hot soups or stews during cooking, a long handled ladle with a shallow cylindrical cup is provided. The bottom of the cup is modified into the shape of a truncated cone open at both ends, with the large lower end of the cone opening into the underside of the cup and with the small upper end of the cone opening into the reservoir for collected fat of the ladle. The sides of the ladle are higher than the small end of the cone to prevent overflow. The large end of the cone can be covered with a removable, coarse screen to separate floating particulate matter from the fat to be separated and to prevent the device from becoming clogged by particulate matter during use. This utensil functions in the collection, concentration and removal of liquid fats from soups or stews simply by lowering the ladle into the broth until all the fat captured by the large end of the cone is forced through the small end of the cone and into the reservoir for collected fat of the ladle. The screen may be removed for cleaning or when not needed, as when the ladle is used to skim thick stews or when there is no particulate matter floating in the soup.

1 Claim, 1 Drawing Sheet

KITCHEN UTENSIL TO REMOVE FAT FROM BROTH

BACKGROUND—FIELD OF THE INVENTION

This invention relates to kitchen utensils, specifically to such utensils which are used for removing liquid fats from the surface of soups and stews, and more specifically to such utensils which collect and concentrate the liquid fat to facilitate removal.

BACKGROUND—DESCRIPTION OF THE PRIOR ART

The separation of liquid fat from the surface of soups and stews has long been a goal as evinced by ancient bronze skimmers found at Pompei. These ancient tools are very similar to the ladles and large spoons which remain the principal tools used today to skim fat from broth. In addition to the simple spoon, various modified ladles are made to skim fat. These modified ladles have the upper edge of the cup modified to contain vertical or horizontal slots, holes, or extensions intended to exclude floating vegetables from the bowl of the ladle. Some modified ladles also have drains in the bottom of the cup while others have the cup divided into compartments. Another type of skimmer is powered by vacuum. Other utensils sometimes used to separate fat from broth include basters and modified basters, and decanters which may either drain the heavier liquid from under the lighter liquid or serve to pour the lighter liquid from the top of the heavier liquid. Also, a brush with lipophilic fibers is available to absorb fat from broth, while another fat removing device relies on disposable absorbent pads to remove the fat.

These devices suffer from a number of disadvantages. Ladles, spoons, modified ladles, vacuum skimmers, basters and modified basters are extremely difficult to use since they require that the instrument be held precisely at the thin layer of fat. Inevitably, a large amount of broth is removed with the fat and further decantation is required. Decanters are limited in their usefulness since neither type will function well if the liquids to be separated contain particulate matter. The lipophilic brush is messy to use and holds only a very small amount of fat before it must be cleaned. The device that uses disposable absorbent pads is expensive to use since a supply of these pads is required. Also, none of these devices concentrate the fat prior to removal and so to remove all the fat from a broth with any of the above mentioned devices is a time consuming process and the results are far from satisfactory.

Another class of fat skimming devices, similar to the present invention, includes devices that collect the thin layer of fat from the surface of the broth and concentrate this thin layer of fat prior to removing it. These devices are represented by various patents which are discussed subsequently.

U.S. Pat. No. 858,291 to Irby (1907) shows a device with complicated construction, a cumbersome handle and with the hole in the center of the concentrating cone being proportionally too large for effective concentration of the fat. This device has no pour spout for emptying. One alternative embodiment presented has an insufficient angle on the concentrating cone to function properly and the edge of the cup is much too high. The alternative embodiments concentrate the fat very little prior to removal. None of the embodiments presented have a screen positioned to prevent floating material from clogging the device.

2

U.S. Pat. No. 2,575,768 to Pearsall (1951) shows a skimmer with excessively complicated and difficult construction and operation, with the handle on this device shaped such that the device cannot be lowered into a deep pot. This device has a very shallow angle on the concentrating cone and the top of the cone terminates in a vertical cylinder which serves no constructive purpose and causes the device to require a deeper broth in which to function. This device has corners and crevices which are impossible to clean, and the operator cannot see when the device is full. This device has no provision for a screen to prevent clogging.

U.S. Pat. No. 2,795,119 to Bait (1957) shows a skimmer with an extremely shallow angle on the concentrating chamber which causes this device to be very slow and inefficient. The location of the hole in the side of the concentrating chamber is not as efficient as if it were located in the center. This device has no pour spout for emptying. This device has no screen and so the very small hole in the side of the collection chamber will become plugged easily.

U.S. Pat. No. 3,326,384 to Wessels (1967) shows a device with hopelessly complicated construction and with the angle of the handle being such to prevent its use in deep pots. This device does not concentrate the fat to any great extent and it must be held very level during use for it to function properly. This device is impossible to clean and it is messy to empty. There are no provisions for a screen to prevent clogging.

U.S. Pat. No. 3,392,845 to Shapiro shows a device with complicated construction with crevices that are impossible to clean. This device has a very flat angle on the concentrating cone which makes it slow and inefficient and the device has a horizontal lip around the outside circumference of the concentrating cone which makes this device even less efficient. The handles on this device are clumsy to use, the device has no pour spout and the large overall diameter of this device prevents its use in small pots. This device incorporates a screen with very small openings to cover the small end of the concentrating cone. Since all the floating material is concentrated toward the screen along with the fat, and since the screen has very small openings, this device will plug up immediately. This device has no provision for a screen to exclude particulate matter from the inflow orifice.

U.S. Pat. No. Des. 210,399 to Wichmann (1968) shows a device with a very shallow angle on the concentrating cone which makes this device slow and inefficient. The sides of this device are much higher than necessary to collect the fat that is separated and the very short handle on this device makes it dangerous to use around boiling liquids. The device has a crevice around the base of the wall which is inaccessible to cleaning and it has no provision for a screen to separate particulate matter.

U.S. Pat. No. 5,084,177 to Keene (1992) shows a device with a very shallow collecting dome which has various small domes protruding upward from the large dome with each of these small domes having a small hole in its apex. This device is very inefficient due to the very shallow angle of the collecting dome. It has no screen and so the small holes will plug almost immediately upon use in any broth with even the smallest pieces of floating particulate matter.

SUMMARY

Therefore, it is evident that all of the patented devices mentioned herein suffer from a number of disadvantages and that all of these devices lack the right combination of features to effectively solve the simple problem of separating fat from broth. Of particular note is that none of these devices have any provision for a screen to exclude floating particulate matter from the inflow orifice of the concentrating cone, with the result that the floating particulate matter is not separated from the fat to be removed and this particulate matter is concentrated along with the fat toward the outflow orifice and the devices clog immediately. This critical problem is not addressed in the prior art and therefore these devices are of limited use. Evidence of their lack of function is seen in their lack of commercial success.

Therefore, the object of the fat separating device of the present invention is to fill the long standing need for a fat separator that is easy to use, efficient, fast, economical, durable, safe, easy to clean and universally useful.

Accordingly various advantages of the device of the present invention are described subsequently.

This device does not require that it be held near the thin layer of floating fat. Simply by lowering this device into the broth the thin layer of floating fat from a relatively large area is captured and concentrated into a deep layer which is then easily and completely collected into the reservoir for collected fat. By repeating this a few times on different areas, virtually all the floating fat can be removed in a matter of seconds. The operator can easily see through the clear central portion of the device when the fat/water interface is rising to the outflow orifice and stop precisely when all the fat has been separated. A complete separation is accomplished so easily and quickly, a task that was formerly drudgery is now actually enjoyable. There is virtually no broth captured with the skimmed fat, and a secondary separation is not required. This device works well in thin broths, in soups with floating vegetables or in thick stews. Floating vegetables are kept out of the way by being forced downward by the removable screen which covers the inlet. The device is used without the screen to skim broths without floating material or to skim very thick stews. This device has no moving parts and no disposable elements. It is not messy to use and it disassembles for easy and complete cleaning. It has handy right and left handed pour spouts for easy and sanitary emptying of the collected fat. This skimmer is durable, being made from extremely strong plastic, and it has a frosted, scratch resistant finish which will look good for years. The handle is attached a sharp upward angle to allow the device to skim close to the sides of the pot and to allow the device to be used in deep pots. The smaller diameter of this skimmer allows its use in almost any pot, and it will function in liquids only a few inches deep. The long handle keeps the operator's hands at a safe distance from the hot liquids.

Therefore, it can be seen that the right combination of features incorporated in the device of the present invention produces surprising results that are not produced by the prior art. Especially, the innovation of the removable coarse mesh screen positioned over the inflow orifice to effectively remove floating particulate matter from the fat to be separated and to prevent the device from becoming clogged, solves a problem not addressed by the prior art. This innovation produces new and unobvious results and solves the prior inoperabilities of this type of device.

Further objects and advantages of the present invention will become apparent from a consideration of the ensuing drawings and description.

DESCRIPTION OF THE PREFERRED EMBODIMENTS

Figure 1:
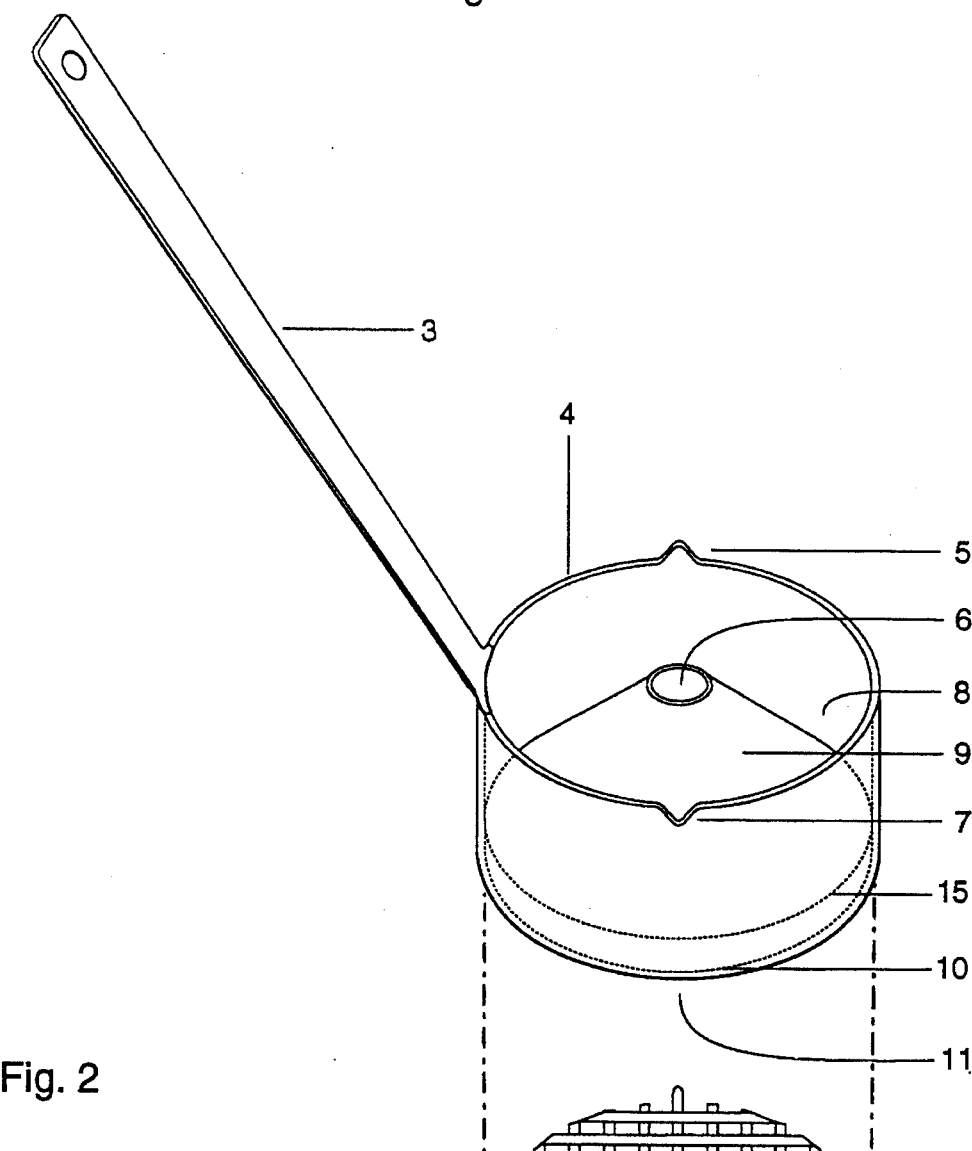
FIG. 1 shows a perspective view of an embodiment of the invention with the removable screen shown.
Figure 2:
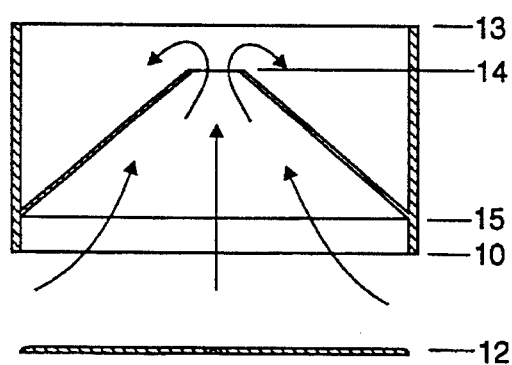
FIG. 2 is a cross sectional view of the invention showing the function of the device and the removable screen.

A typical embodiment of the present invention is illustrated in FIG. 1. This fat skimming device has a long handle 3 attached at a sharp upward angle to the upper edge of the annular vertical side wall of the shallow open cylinder which forms the cup 4. The side wall of the cup is integrally formed with the bottom wall. The bottom wall is modified into a truncated cone open at both ends to form the concentrating cone 9 which has a large inflow orifice 11 opening into the bottom of the cup, and a relatively much smaller outflow orifice 6 which opens into the interior of the cup 4 to allow the concentrated fat to flow into the reservoir for collected fat 8 which has a right-handed 5 and a left-handed 7 pour spout for sanitary emptying of the fat collected. The downward extension of the side wall of the cup 4 forms the bottom lip 10 which serves to collect the thin fat layer and to accomodate the removable coarse mesh screen 12 which separates floating particulate matter from the fat being skimmed and prevents this particulate matter from clogging the device.

The level of the top of the cup 13 must be higher than the level of the outflow orifice 14 to prevent overflow. The level of the cone attachment 15 to the side wall of the cup, is above the bottom edge of the side wall which creates the protruding bottom lip 10.

To remove the thin layer of liquid fat that collects on the surface of soups or stews during cooking, the device of the present invention is held by the handle 3 and the bottom lip 10 is pressed slowly down into the soup. The thin layer of floating fat surrounded by the bottom lip 10 is forced through the inflow orifice 11 and then through the concentrating cone 9 wherein it is formed into a thick layer which is then forced through the outflow orifice 6 and into the reservoir for collected fat 8 which can be emptied when full using the right handed 5 or left handed 7 pour spouts.

When the operator is visually apprised that the separation is complete by the appearance at the outflow orifice 6 of the water/fat interface, the device can be raised out of the liquid and the process repeated several times to completely clear soups or stews of floating fat in a matter of seconds.

The coarse mesh removable screen 12 covers the inflow orifice 11 to remove floating particulate matter from the fat being skimmed and thereby prevent the device from being clogged.

While the description of the present invention contained herein contains various specificities, these should not be construed as limitations on the scope of the invention but rather as an exemplification of one preferred embodiment thereof. Other variations are possible; such as changes in size to make the device larger for commercial use, changes in shape to make the device oval or to change the handle shape, changes in color, or changes in composition to make the device out of stainless steel, glass, ceramic or other material.

Accordingly, the scope of this invention should be determined not by the embodiment illustrated, but by the appended claim and its legal equivalents.

The invention claimed is:

1. A kitchen utensil for collecting, concentrating and removing liquid fat from the surface of soups and stews comprising:

a shallow cylindrical cup;

with a long handle attached at a sharp upward angle to the upper edge of the annular vertical side wall of the cup and with the cup having its side wall and its bottom wall integrally formed;

with the bottom wall being composed of a truncated cone open at both ends to form the concentrating cone with the large lower end of the concentrating cone opening into the underside of the cup to form the inflow orifice and with the small upper end of the concentrating cone opening into the interior of the cup to form the outflow orifice;

with said concentrating cone having its large lower end attached to the cup side wall slightly above the bottom edge of the side wall of the cup to form the bottom lip with said bottom lip serving to gather the fat to be removed;

wherein the improvement comprising:

a removable coarse mesh screen accomodated by the bottom lip and covering the inflow orifice of the device, said screen serving as a means to separate floating particulate matter from the fat to be removed and so to prevent clogging of said concentrating cone said screen further being removable from said bottom lip such that said utensil may be used to skim liquid fat from thick stews or broths without particulate matter.

* * * * *